United States Patent [19]

Maurice et al.

[11] Patent Number: 4,501,760

[45] Date of Patent: Feb. 26, 1985

[54] PRODUCTION OF FAT-CONTAINING PROTEIN FIBERS

[75] Inventors: Terrence J. Maurice, Colborne; Jennifer M. Grealy, Gores Landing, both of Canada

[73] Assignee: General Foods, Inc., Toronto, Canada

[21] Appl. No.: 452,746

[22] Filed: Dec. 23, 1982

[51] Int. Cl.³ ............................................... A23J 3/00
[52] U.S. Cl. ................................. 426/250; 426/276; 426/656; 426/657; 426/802
[58] Field of Search ............... 426/104, 250, 276, 656, 426/657, 802

[56] References Cited

U.S. PATENT DOCUMENTS

| 3,772,035 | 11/1973 | Carp et al. | 426/104 X |
| 3,870,801 | 3/1975 | Tombs | 426/276 X |
| 3,987,213 | 10/1976 | Hawkins | 426/276 X |
| 4,208,323 | 6/1980 | Murray et al. | 426/656 X |
| 4,296,026 | 10/1981 | Millar | 426/657 X |
| 4,328,252 | 5/1982 | Murray et al. | 426/276 X |

Primary Examiner—Robert Yoncoskie
Attorney, Agent, or Firm—Sim & McBurney

[57] ABSTRACT

Protein fibres are formed by extruding an emulsion of protein micellar mass (PMM) and vegetable oil through openings into hot water. The formation of the emulsion containing a vegetable oil permits oil-soluble flavors and colorants to be present in the fibres and adds a juicy mouthfeel to the fibres. The fibres are useful in a variety of food analog products.

9 Claims, No Drawings

PRODUCTION OF FAT-CONTAINING PROTEIN FIBERS

FIELD OF INVENTION

The present invention relates to the production of protein fibres.

BACKGROUND TO THE INVENTION

In U.S. Pat. No. 4,328,252 assigned to the assignee herein, the disclosure of which is incorporated herein by reference, there is described a process for the formation of protein fibres, in which a protein isolate, known as protein micellar mass, sometimes referred to herein as "PMM" is injected into hot water having a temperature above 90° C. through a plurality of openings.

The novel protein isolate is defined in U.S. Pat. No. 4,285,862, assigned to the assignee of this application, the disclosure of which is incorporated herein by reference, as a substantially undenatured protein isolate product containing at least about 90% by weight of protein (as determined by Kjeldahl nitrogen x 6.25) and in the form of an amorphous protein mass which is formed by settling the solid phase from an aqueous dispersion of protein micelles consisting of homogeneous amphiphilic protein moieties and formed from at least one protein source material, the product having substantially no lipid content, substantially no lysinoalanine content and substantially the same lysine content as the storage protein in the source material.

Such novel protein isolate may be formed by the procedures defined in U.S. Pat. Nos. 4,169,090, 4,208,323, 4,296,026 and 4,307,014, assigned to the assignee herein, the disclosures of which are incorporated herein by reference. In these patents, there are described procedures for isolating protein from protein source materials by solubilizing the protein by contact of the protein source material with sodium chloride solution under critical pH and ionic strength conditions and diluting the protein solution with water to a lower ionic strength to cause the formation of the dispersion of protein micelles in the aqueous phase from which is settled as the amorphous protein micellar mass. The protein solution may be subjected to ultrafiltration prior to the dilution step and the settling may be enhanced by centrifugation.

The process of U.S. Pat. No. 4,169,090 involves solubilizing the protein in the vegetable protein source material at a temperature of about 15° to 35° C. using a food grade salt solution having a concentration of at least 0.2 molar ionic strength and a pH of 5.5 to 6.3 to form a protein solution, and diluting the protein solution to an ionic strength of less than 0.1 molar to cause formation of the dispersion.

The process of U.S. Pat. No. 4,208,323 involves solubilizing the protein in the vegetable protein source material at a temperature of about 15° to about 35° C. using a food grade salt solution having a concentration of at least 0.2 molar ionic strength and a pH of about 5 to about 6.8 to form a protein solution, increasing the protein concentration of the protein solution while maintaining the ionic strength thereof substantially constant, and diluting the concentrated protein solution to an ionic strength below about 0.2 molar to cause formation of the dispersion.

In the latter process, the food grade salt solution preferably has an ionic strength of about 0.2 to about 0.8 molar and a pH of about 5.3 to about 6.2. In addition, the protein concentration step is preferably effected by a membrane technique at a volume reduction factor about 1.1 to about 6.0, as determined by the ratio of volume of protein solution and the volume of concentrated protein solution.

Further, the dilution of the concentrated protein solution is preferably effected by passing the concentrated protein solution into a body of water having a temperature below about 25° C. and a volume sufficient to decrease the ionic strength of the concentrated protein solution to a value of about 0.06 to about 0.12 molar.

In one embodiment of the latter process, the food grade salt solution has a pH of about 5 to about 5.5 and the phosphorus content of the protein solution is decreased prior to the dilution step.

The food grade salt used in the above-described solubilization procedures usually is sodium chloride, although other salts, such as, potassium chloride or calcium chloride may be used.

As is set forth in U.S. Pat. No. 4,296,026, the purity of isolate which is obtained from soybeans may be improved by the presence of millimolar amounts of calcium chloride in the aqueous sodium chloride solution. As described therein, the protein is solubilized by contact with an aqueous sodium chloride solution having an ionic strength of at least about 0.2 molar and containing about 0.001 to about 0.01M calcium chloride and having a temperature of about 15° to about 75° C.

Further, as is set forth in U.S. Pat. No. 4,307,014, the yield of isolate which is obtained from soybeans may be improved by effecting the protein solubilization at a temperature of about 15° to about 75° C. using an aqueous food grade salt solution of ionic strength of at least 0.2M and a pH of about 5.6 to about 7.0, preferably about 6.0 to about 6.4, and then adjusting the pH of the protein solution to a pH of about 4.8 to about 5.4, preferably about 5.1 to about 5.3, prior to dilution of the pH-adjusted protein solution.

It is disclosed in U.S. Pat. No. 4,328,252 that the fibres may be coloured by incorporating an appropriate colouring compound into the wet protein micellar mass prior to injection into the hot water. In order to effect uniform and effective colouring of the fibres, water-soluble colouring compounds must be used. This requirement severely limits the choice of colourants which can be used and, further, results in loss of some colour by leaching into the hot water.

Further, it is often desirable to incorporate flavourings into protein fibres. Such flavourings often are not water-soluble and generally have had to be incorporated into the food product rather than into fibres present in such food products. Further, in the conventional isoelectric protein fibre formation process wherein protein is extracted into alkaline medium and the alkaline extract is extruded into an acid medium, there is a tendency for fats to saponify, thereby impairing the ability to use fat-containing materials.

SUMMARY OF INVENTION

In accordance with the present invention, these prior art problems are surprisingly overcome by forming an emulsion of an edible lipid material in the protein micellar mass, and extruding the emulsion into the hot water bath to form protein fibres.

By forming an emulsion of the PMM with an edible lipid material, oil-soluble colourants and flavours can be dissolved in the edible lipid material and thereby can be incorporated into the fibres. The presence of the edible lipid material in the emulsion also imparts a juicy mouthfeel to the fibres.

GENERAL DESCRIPTION OF INVENTION

The emulsion of protein micellar mass and lipid material is formed in this invention by mixing the wet protein micellar mass, produced by the procedures of U.S. Pat. Nos. 4,169,090, 4,208,323, 4,296,026 and 4,307,014 referred to above, with the lipid material under sufficient shear to effect dispersion of the lipid material and emulsification to a relatively stable emulsion, that is, the lipid material tends to remain dispersed and does not tend to coalesce and separate out. The PMM is functioning as an emulsifying agent for the lipid material in the emulsion.

The proportion of lipid material which may be incorporated into the emulsion may be varied widely up to about 30 wt% of the emulsion, depending on the texture of fibre desired and is preferably about 5 to about 20 wt% of the emulsion. Usually, any oil-soluble flavours or colourants are dissolved or otherwise incorporated in the lipid material prior to emulsification.

The incorporation of oil-soluble flavours and colourants into the fibres through the formation of an emulsion of wet PMM and edible lipid material may be combined with the incorporation of water-soluble flavours and colourants dissolved in the wet PMM.

The wet PMM may be that produced as settled solid phase from the dispersion of micelles in the aforementioned U.S. patents or may be rehydrated from dried isolate. The protein source from which the PMM is formed is usually a plant protein, including cereals, for example, wheat, corn, oats, rye, barley and triticale, legumes, for example, field peas, chickpeas, fababeans, navy beans and pinto beans, and oil seeds, such as, soybeans. The wet PMM usually has a moisture content of about 50 to about 80 wt%, depending on the conditions of formation of the PMM.

The edible lipid material may be any desired edible solid or liquid lipid and preferably is an edible oil, in view of the ready availability of such oils and the ready manner of incorporation of colourants and flavours therein.

Preferably, the edible oil is an edible vegetable oil, such as, cottonseed oil, peanut oil and olive oil.

The fibres are formed from the emulsion by extruding the emulsion through a plurality of openings or a single opening into a bath of a coagulating medium, usually water. In order to achieve fibre formation, the extruded material must be exposed to heat for a sufficient time and at a sufficient temperature effectively to denature the extruded protein in the form of fibre monofilaments which maintain their integrity when removed from the bath.

In order to ensure that the extruded material maintains its structural integrity for a sufficient period to ensure that heat setting occurs, a bath temperature of at least about 90° C. usually is used, preferably, for a water bath, the temperature is at least about 95° C., since rapid penetration of heat into the fibre and rapid denaturation of the protein into distinct fibre monofilaments occurs. The water bath may have a pH of about 5.5 to about 7.5.

As the emulsion is extruded into the hot water bath, some of the lipid material, and consequently any flavours and colourants dissolved therein, disperses in the hot water bath but enough is retained in the fibres to impart a juicy mouthfeel and to carry flavours and colourants into the fibres.

The concentration of lipid material which is present in the fibres does not significantly affect the strength of the fibres, although the fibres are generally softer than those produced directly from the PMM. In our copending U.S. application Ser. No. 452,702 filed Dec. 23, 1984, the disclosure of which is incorporated herein by reference, it is disclosed that the fibre strength of PMM fibres can be improved by mixing low concentrations of starch with the PMM prior to extrusion. It has been found that the effect of the addition of starch is much less marked for the emulsions which are extruded to form fibres in this invention.

The pH of the PMM in the emulsion is a critical parameter of the process and is about 5.5 to about 5.85. At pH 6.0, no collectible fibres are produced, the emulsion being thin and dispersing in the hot water bath to form small heat set chunks. At pH 5.4, the PMM is low in moisture and emulsions are thick and difficult to extrude.

The diameter of the fibres obtained by the process of the invention may be varied by varying the diameter of the openings through which the emulsion is injected into the hot water. Usually, the diameter of the openings is in the range of about 0.005 to about 0.020 inches.

The protein fibres which are formed in accordance with the present invention may be used in simulated adipose tissue, bacon analogs, meat snack analogs, sausage meat and other meat analogs, shrimp and crab meat analogs, soup mixes, stews and casseroles.

EXAMPLES

Example 1

This example illustrates the production of protein fibres.

Soy PMM was formed following the procedure of U.S. Pat. No. 4,208,323. Soybean concentrate (about 50 wt% protein) was mixed with 50 Imperial gallons of 0.35 molar sodium chloride solution at a 15% w/v concentration at a temperature of about 25° C. The mixture was stirred for about 30 minutes at a pH of about 5.8. The aqueous protein extract was separated from residual solid matter.

The extract was concentrated on an ultrafiltration unit using a "ROMICON" (Trademark) type XM50 and a Romicon type PM50 cartridge for a time sufficient to achieve a volume reduction factor of four times. The Romicon ultrafiltration cartridges are manufactured by Rohm and Haas Company, the designation "50" referring to a molecular weight cut-off of 50,000 Daltons.

The concentrate was diluted into cold water having a temperature of 7° C. to an ionic strength of 0.1 molar whereupon a white cloud of protein isolate formed in the dilution system. The protein dispersion was allowed to settle as a highly viscous amorphous gelatinous precipitate (wet PMM) in the bottom of the dilution vessel. The wet PMM was separated from the residual aqueous phase.

The wet PMM, as is and after adjusting to pH 5.65, was mixed with varying amounts of corn oil in a Waring blender at high speed for about 60 seconds to form an emulsion. The emulsions produced showed no tendency to separate and appeared to be stable.

The emulsion was loaded into a fibre-forming apparatus comprising an elongate tube having a plurality of orifices of diameter 0.015 inches at the lower end and an air pressure inlet at the upper end. The orifices were immersed in a hot water bath having a temperature of about 95° C. and the mixture was extruded through the orifices downwardly into the hot water bath using 12 psi air pressure.

Fibre microfilaments were extruded for three minutes and allowed to heat set for a further two minutes before being removed from the hot water bath. The oil content of the fibres was determined for the various added vegetable oil concentrations. The results obtained are reproduced in the following Table I:

TABLE I

| Oil Added to PMM wt % | Oil Remaining in Fibres (wt %) | |
|---|---|---|
| | pH 5.65 | pH 5.8 |
| 5 | 2.62 | 1.58 |
| 10 | 4.74 | 3.02 |
| 20 | 6.88 | 4.70 |

As may be seen from the results in above Table I, a substantial proportion of the oil is retained by the fibres, with the oil retention decreasing with increased pH of PMM.

Example 2

This example illustrates the effect of oil content on fibre strength.

The fibre strength of the protein fibres produced by the procedure of Example 1 was determined by measuring the shear strength of the fibres in a gel matrix.

The basic gel was formed from a 20% w/w dispersion of soy PMM at pH 5.5 and 0.3M NaCl. Fibres were cut to ¼-inch lengths and incorporated into the dispersion to a concentration of 4 g of fibres to 30 ml of dispersion. The mixture of protein isolate dispersion and fibre pieces was heat set in a greased stainless steel gel tube of dimensions 2½ in. × ¾ in. I.D. at 100° C. for 45 minutes and then cooled to 20° C. for 20 minutes.

The shear strength of the gels was measured using the Warner-Bratzler apparatus, which is described in detail in an article entitled "Modification of Texture Instruments" by P. W. Voisey, J. of Texture Studies, 2 (1971), p. 129 to 195, was used in the shear strength determinations.

The results obtained are set forth in the following Table II:

TABLE II

| | Shear Force (kg)* | | | |
|---|---|---|---|---|
| pH of PMM | 0% oil | 5% oil | 10% oil | 20% oil |
| 5.65 | 3.3 | 2.9 | 3.3 | 3.0 |
| 5.80 | — | 3.3 | 2.8 | 2.5 |

*Shear force of base gel was 2.5 kg

As can be seen from the results of the above Table II, varying the concentration of oil did not significantly vary the fibre strength.

SUMMARY OF DISCLOSURE

In summary of this disclosure, the present invention provides a method of forming flavoured protein fibres which involves emulsification of an oil containing the flavour in PMM. Modifications are possible within the scope of this invention.

What we claim is:

1. A process for the production of protein fibres from a protein source material, which comprises:
    (a) forming an aqueous dispersion of protein micelles consisting of amphiphilic protein moieties from at least one vegetable protein source material by solubilization of the protein source material using food grade salt solution and subsequent dilution of the protein solution,
    (b) settling said aqueous dispersion of protein micelles to provide an amorphous protein mass containing a substantially undenatured protein isolate having a pH of 5.5 to 5.85, said isolate having substantially no lipid content, substantially no lysinoalanine content and substantially the same lysine content as the storage protein in the protein source material,
    (c) separating the amorphous protein mass having a moisture content of about 50 to about 80 wt.% from residual aqueous phase,
    (d) admixing the separated amorphous protein mass with an edible vegetable oil under conditions of high shear to form an emulsion containing about 5 to about 20% by weight of the oil,
    (e) injecting said emulsion through a plurality of openings of diameter of about 0.005 to about 0.020 inches into water having a pH of about 5.5 to about 7.5 and a temperature of at least about 90° C. to form fibres by coagulation, and
    (f) removing the fibres so produced from the hot water.

2. The process of claim 1 wherein said water has a temperature of at least about 95° C.

3. The method of claim 1 wherein said aqueous dispersion of protein micelles from which said isolate is settled is formed by solubilizing the protein in said at least one vegetable protein source material using a food grade salt solution having a concentration of at least 0.2 molar ionic strength and a pH of 5.5 to 6.3 to form a protein solution, and diluting the protein solution to an ionic strength of less than 0.1 molar to cause formation of said dispersion.

4. The method of claim 1 wherein said aqueous dispersion of protein micelles from which said isolate is settled is formed by solubilizing the protein in said at least one vegetable protein source material using a food grade salt solution having a concentration of at least 0.2 molar ionic strength and a pH of about 5 to about 6.8 to form a protein solution, increasing the the protein concentration of said protein solution while maintaining the ionic strength thereof substantially constant, and diluting the concentrated protein solution to an ionic strength below about 0.2 molar to cause formation of said dispersion.

5. The method of claim 4 wherein said food grade salt solution has an ionic strength of about 0.2 to about 0.8 molar, a pH of about 5.3 to about 6.2, said protein concentration step is effected by a membrane technique at a volume reduction factor of about 1.1 to about 6.0, as determined by the ratio of volume of protein solution and the volume of concentrated protein solution, and the dilution of the concentrated protein solution is effected by passing the concentrated protein solution into a body of water having a temperature below about 25° C. and a volume sufficient to decrease the ionic strength of the concentrated solution to a value of about 0.06 to about 0.12 molar.

6. The method of claim 5 wherein said protein source material is soybeans, said food grade salt is sodium chloride and said aqueous food grade salt solution further contains about 0.001 to about 0.01M of calcium chloride.

7. The method of claim 1 wherein said dispersion of protein micelles from which said isolate is settled is formed by solubilizing the protein in soybeans at a temperature of about 15° C. to about 75° C. using a food grade salt solution having a concentration of at least 0.2 molar ionic strength and a pH of about 5.6 to about 7.0 to form a protein solution, adjusting the pH of the protein solution to a pH of about 4.8 to about 5.4, and diluting the pH-adjusted solution to an ionic strength value sufficiently low to cause formation of said dispersion.

8. The method of claim 7 wherein said solubilization pH is about 6.0 to about 6.4 and said adjusted pH is about 5.1 to about 5.3.

9. The method of claim 1, including dissolving an oil-soluble flavouring and/or colouring agent in said vegetable oil prior to said emulsification, whereby such agent may be incorporated in the protein fibres.

* * * * *